United States Patent
Wang

(10) Patent No.: US 9,248,559 B2
(45) Date of Patent: Feb. 2, 2016

(54) LENS MODUEL ASSEMBLY DEVICE AND METHOD

(75) Inventor: Chien-Chun Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 853 days.

(21) Appl. No.: 13/484,291

(22) Filed: May 31, 2012

(65) Prior Publication Data

US 2013/0160263 A1    Jun. 27, 2013

(30) Foreign Application Priority Data

Dec. 21, 2011  (TW) .............................. 100147586 A

(51) Int. Cl.
*B25B 27/00*  (2006.01)
*B23P 19/04*  (2006.01)
*B25B 9/00*  (2006.01)

(52) U.S. Cl.
CPC ................. *B25B 27/00* (2013.01); *B23P 19/04* (2013.01); *B25B 9/00* (2013.01); *Y10T 29/53909* (2015.01)

(58) Field of Classification Search
CPC ..... Y10T 29/53909; A47F 1/10; A47F 1/106; A47F 1/125; A47F 1/126; B23P 19/04; B25B 27/00
USPC ..................................... 29/270; 221/279, 251
See application file for complete search history.

(56) References Cited

U.S. PATENT DOCUMENTS

| | | | | | |
|---|---|---|---|---|---|
| 1,469,004 | A | * | 9/1923 | Holtz | A61C 5/062 29/270 |
| 2,294,001 | A | * | 8/1942 | Ritter | B65D 83/0409 124/10 |
| 2,431,121 | A | * | 11/1947 | Hunter | G07D 1/08 211/59.2 |
| 2,495,040 | A | * | 1/1950 | Walden | B25B 27/0057 157/1.1 |
| 3,998,238 | A | * | 12/1976 | Nigro | G07D 9/002 221/279 |
| 4,113,143 | A | * | 9/1978 | Spagnola, Jr. | A63F 11/0002 221/267 |
| 4,535,913 | A | * | 8/1985 | Hooie | A63F 11/0002 221/251 |
| 4,854,761 | A | * | 8/1989 | Smith | A45D 29/007 132/73.5 |
| 4,887,738 | A | * | 12/1989 | Jennings | B65D 83/0409 221/221 |
| 7,658,368 | B2 | * | 2/2010 | Laun | B25C 11/02 254/18 |
| 8,307,529 | B2 | * | 11/2012 | Chapin | B25B 27/02 29/270 |
| 2013/0086802 | A1 | * | 4/2013 | Wang | G02B 7/023 29/721 |
| 2014/0013560 | A1 | * | 1/2014 | Wang | B23P 19/04 29/281.1 |
| 2014/0208560 | A1 | * | 7/2014 | Chu | B25B 11/007 29/283 |
| 2014/0237788 | A1 | * | 8/2014 | Wang | B26D 1/04 29/282 |

* cited by examiner

*Primary Examiner* — Lee D Wilson
*Assistant Examiner* — Jamal Daniel
(74) *Attorney, Agent, or Firm* — Novak Druce Connolly Bove + Quigg LLP

(57) ABSTRACT

Provided is a lens module assembly device for assembling a filter glass into a lens barrel of a lens module. The lens module assembly device includes a clipping element, a receiving element, and a pushing element. The clipping element includes a chamber configured for clipping the lens barrel. The receiving element extends from one end of the clipping element and includes a receiving portion for receiving a number of filter glasses. The receiving portion includes a resisting end received in the chamber and an entrance end away from the resisting end. The pushing element is inserted into the receiving portion through the entrance end until resisting against one of the filter glass. The pushing element pushes one of filter glasses out of the receiving portion into the lens barrel.

10 Claims, 3 Drawing Sheets

LENS MODUEL ASSEMBLY DEVICE AND METHOD

BACKGROUND

1. Technical Field

The present disclosure relates to assembly devices and, particularly, to a lens module assembly device and a lens module assembly method.

2. Description of Related Art

A process of assembling a lens module includes steps: pushing lenses into a lens barrel; clipping a filter glass through an iron tweezers then attaching the filter glass on a lens close to an image-side of the lens module; using the iron tweezers to flatten the filter glass repeatedly in order to avoid distortion, and then coating adhesive on the filter glass to firmly attach the filter glass onto the lens. However, using the iron tweezers flatten the flute glass repeatedly, this carries the risk of a surface of the filter glass being scratched and abraded when the iron tweezers and the filter glass rub against each other.

In addition, it is time-consuming and inefficient.

Therefore, it is desirable to provide a lens module assembly device and a lens module assembly method, which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
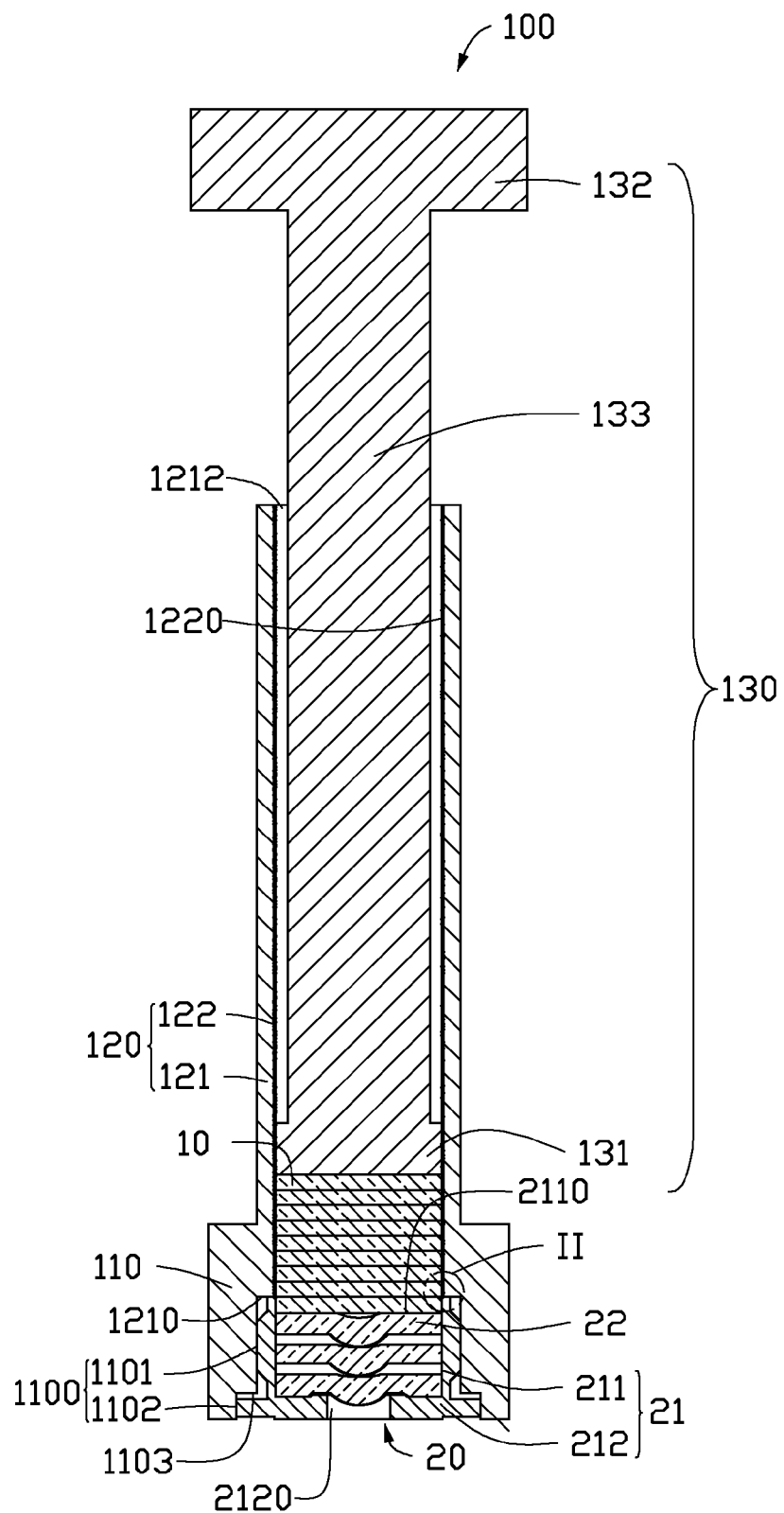
FIG. 1 is a schematic cross-section of a lens module assembly device according to an exemplary embodiment.
Figure 2:
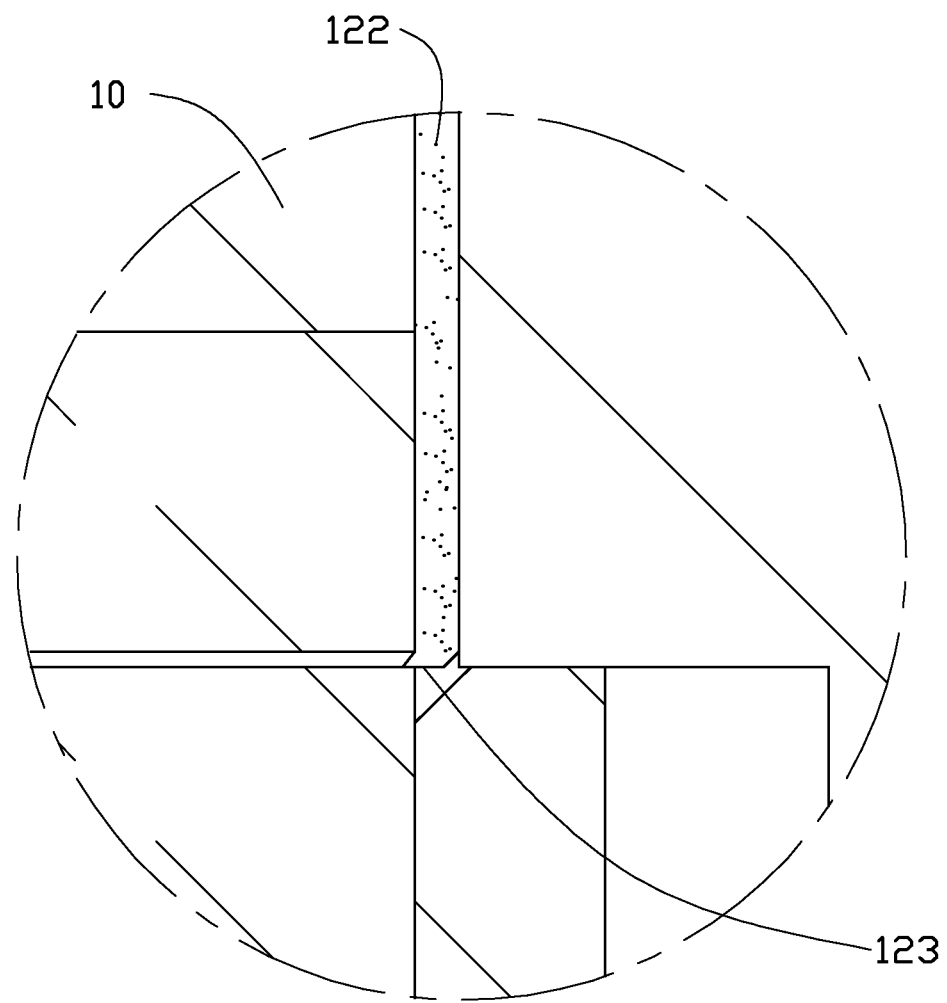
FIG. 2 is an enlarged view of a circled portion II of FIG. 1.

FIGS. 1-2, illustrate a lens module assembly device 100 according to an exemplary embodiment, for assembling a filter glass 10 into a lens module 20.

The lens module 20 includes a lens barrel 21 and three lenses 22 received in the lens barrel 21. The lens barrel 21 is a hollow cylinder in shape, and includes a main body 211 and an annular aperture plate 212. The annular aperture plate 212 is positioned at the object-side end of the main body 211 and is integrally formed with the main body 211. The image-side end of the main body 211 defines an entrance opening 2110 for assembling the three lenses 22 and the filter glass 10 into the lens barrel 21. The annular aperture plate 212 defines an aperture opening 2120 at the center thereof to allow light rays from objects of interest (not shown) to enter the lens barrel 21.

The lens module assembly device 100 includes a clipping element 110, a receiving element 120, and a pushing element 130.

The clipping element 110 is tubular, and includes a chamber 1100. The size and shape of the chamber 1100 correspond to the size and shape of the lens barrel 21. The clipping element 110 is configured for clipping the lens barrel 21 in place. In particular, the chamber 1100 is circular, and includes a first cavity 1101 and a second cavity 1102 communicating with the first cavity 1101. Both the first cavity 1101 and the second cavity 1102 are concentric with other. The diameter of the first cavity 1101 is less than that of the second cavity 1102, so that a step 1103 is defined between the first cavity 1101 and the second cavity 1102. The axial length of the chamber 1100 in a direction parallel to an optical axial of the lens module 20 is substantially equal to that of the lens barrel 21. The lens barrel 21 is received in the chamber 1100 with the main body 211 being received in the first cavity 1101, and with the annular aperture plate 212 being received in the second cavity 1102. The step 1103 resists against the annular aperture plate 212.

The receiving element 120 includes a receiving portion 121 for receiving a number of filter glasses 10, and an anti-slip layer 122 adhesively positioned on an inner sidewall 1220 of the receiving portion 121. The receiving portion 121 perpendicularly extends upward from one end of the clipping element 110. The shape of the receiving portion 121 corresponds to that of the filter glass 10. In the embodiment, the shapes of both the receiving portion 121 and the filter glass 10 are circular. The receiving portion 121 includes a resisting end 1210 and an entrance end 1212 away from the resisting end 1210. The resisting end 1210 is received in the first cavity 1101. The anti-slip layer 122 is made of non-abrasive plastic. One end of the anti-slip layer 122 close to the resisting end 1210 forms a hook 123 for preventing the number of filter glasses 10 from moving out of position with the receiving portion 121. In the embodiment, the maximum distance between the lens 22 close to the image-side end of the lens module 20 and the resisting end 1210 in a direction parallel to the optical axis of the lens module 20 is slightly larger or equal to the thickness of one filter glass 10, while it is less than the sum of thickness of two filter glasses 10.

In the embodiment, the receiving portion 121 is integrally formed with the clipping element 110. Alternatively, the receiving portion 121 and the clipping element 110 can also be separately formed, for example, the receiving portion 121 can be adhesively attached to the clipping element 110, or soldered to, or may be attached by other suitable methods.

The pushing element 130 includes a pushing portion 131, an operation portion 132 away from the pushing portion 131, and a connection portion 133 connecting between the pushing portion 131 and the operation portion 132. The pushing portion 131 is also circular. An outer diameter of the pushing portion 131 is slightly less than an inner diameter of the receiving portion 121 of the receiving element 120, therefore, the pushing portion 131 is capable of passing through the entrance end 1212 and inserting into the receiving portion 121 to resist against the number of filter glasses 10.

Figure 3:
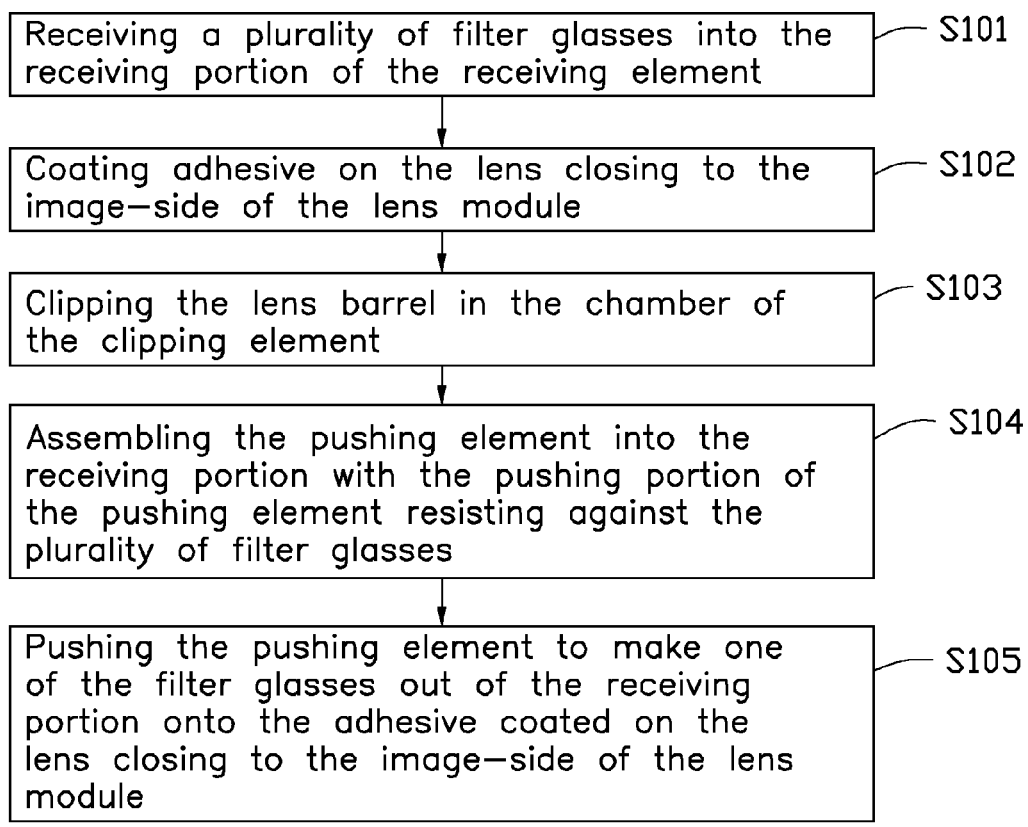
FIG. 3 is a flowchart of a lens module assembly method, according to an exemplary embodiment.

FIG. 3, is a flowchart of a method for assembling a filter glass 10 into the lens module 20. The method includes the following steps: S101: receiving the number of filter glasses 10 into the receiving portion 121 of the receiving element 120 through the entrance end 1212; S102: coating adhesive on a non-optical portion of the lens 22 closing to the image-side end of the lens module 20; S103: clipping the lens barrel 21 in the chamber 1100 of the clipping element 110; S104: assembling the pushing element 130 into the receiving portion 121 with the pushing portion 131 resisting against the number of filter glasses 10; S105: pushing the pushing element 130 through the operation portion 132 to make one filter glass 10 out of the receiving portion 121 onto the adhesive coated on the non-optical portion of the lens 22.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module assembly device for assembling a filter glass into a lens barrel of a lens module, the lens module comprising at least one lens received in the lens barrel, the lens barrel comprising a main body and an annular aperture plate surrounding the main body, the lens module assembly device comprising:
   a clipping element comprising a chamber, the chamber configured for receiving the lens barrel, the chamber comprising a first cavity and a second cavity having a larger diameter than that of the first cavity, the first cavity receiving the main body of the lens barrel and the second cavity receiving the annular aperture plate of the lens barrel;
   a receiving element extending from one end of the clipping element, the receiving element comprising a receiving portion for receiving a plurality of filter glasses, the receiving portion comprising a resisting end received in the chamber and an entrance end away from the resisting end; and
   a pushing element inserted into the receiving portion through the entrance end and configured for pushing one of the filter glasses out of the receiving portion into the lens barrel.

2. The lens module assembly device of claim 1, wherein the receiving element further comprises an anti-slip layer positioned on an inner sidewall of the receiving portion.

3. The lens module assembly device of claim 2, wherein the anti-slip layer is made of non-abrasive plastic.

4. The lens module assembly device of claim 2, wherein one end of the anti-slip layer forms a hook for preventing the plurality of filter glass from moving out of the receiving portion.

5. The lens module assembly device of claim 1, wherein the receiving portion is integrally formed with the clipping element.

6. The lens module assembly device of claim 1, wherein the receiving portion is adhesively attached to the clipping element.

7. The lens module assembly device of claim 1, wherein a size and shape of the chamber correspond to the size and shape of the lens barrel.

8. The lens module assembly device of claim 7, wherein both the first cavity and the second cavity are concentric with each other, a step is defined between the first cavity and the second cavity.

9. The lens module assembly device of claim 8, wherein an axial length of the chamber in a direction parallel to an optical axial of the lens module is substantially equal to an axial length of the lens barrel in the direction parallel to the optical axial of the lens module.

10. The lens module assembly device of claim 8, wherein a maximum distance between the lens close to an image-side end of the lens module and the resisting end in the direction parallel to the optical axis of the lens module is slightly larger or equal to a thickness of one filter glass in the direction parallel to the optical axis of the lens module and is less than the sum of thickness of two filter glasses.

* * * * *